United States Patent [19]

Tatzel et al.

[11] Patent Number: 4,894,191

[45] Date of Patent: Jan. 16, 1990

[54] PREPARATION OF POLYOLEFIN FOAMS

[75] Inventors: Hermann Tatzel, Hirschberg; Ludwig Zuern, Bad Duerkheim; Hans D. Zettler, Gruenstadt; Wolfgang Schneider, Heidelberg; Gerhard Dembek, Bad Duerkheim, all of Fed. Rep. of Germany

[73] Assignee: BASF Aktiengesellschaft, Ludwigshafen, Fed. Rep. of Germany

[21] Appl. No.: 164,491

[22] Filed: Mar. 4, 1988

[30] Foreign Application Priority Data

Mar. 14, 1987 [DE] Fed. Rep. of Germany ....... 3708291

[51] Int. Cl.⁴ .............................................. C08J 9/22
[52] U.S. Cl. ...................... 264/53; 264/85; 264/141; 264/142
[58] Field of Search .................. 264/101, 53, 85, 141, 264/142, 143

[56] References Cited

U.S. PATENT DOCUMENTS

| | | | |
|---|---|---|---|
| 3,812,225 | 5/1974 | Hosoda et al. | 264/54 |
| 4,271,107 | 6/1981 | Phipps | 264/101 X |
| 4,284,596 | 8/1981 | Inokuchi et al. | 264/101 X |
| 4,487,731 | 12/1984 | Kobayashi | 264/101 X |
| 4,631,159 | 12/1986 | Maeda et al. | 264/53 |
| 4,676,939 | 6/1987 | Kuwabara | 264/53 X |
| 4,704,239 | 11/1987 | Yoshimura et al. | 264/53 X |

FOREIGN PATENT DOCUMENTS 1545607 5/1979 United Kingdom .

*Primary Examiner*—Jeffery Thurlow
*Assistant Examiner*—Leo B. Tentoni
*Attorney, Agent, or Firm*—Keil & Weinkauf

[57] ABSTRACT

Polyolefin foams which have a density of from 30 to 300 g/l, do not exhibit after-shrinkage and possess taut cells are prepared by letting down a polyolefin/blowing agent gel, the latter first being let down to 0.1–10 bar gage pressure and the foam being kept at this pressure until it has cooled to at least 20° C. below the expansion temperature.

6 Claims, 1 Drawing Sheet

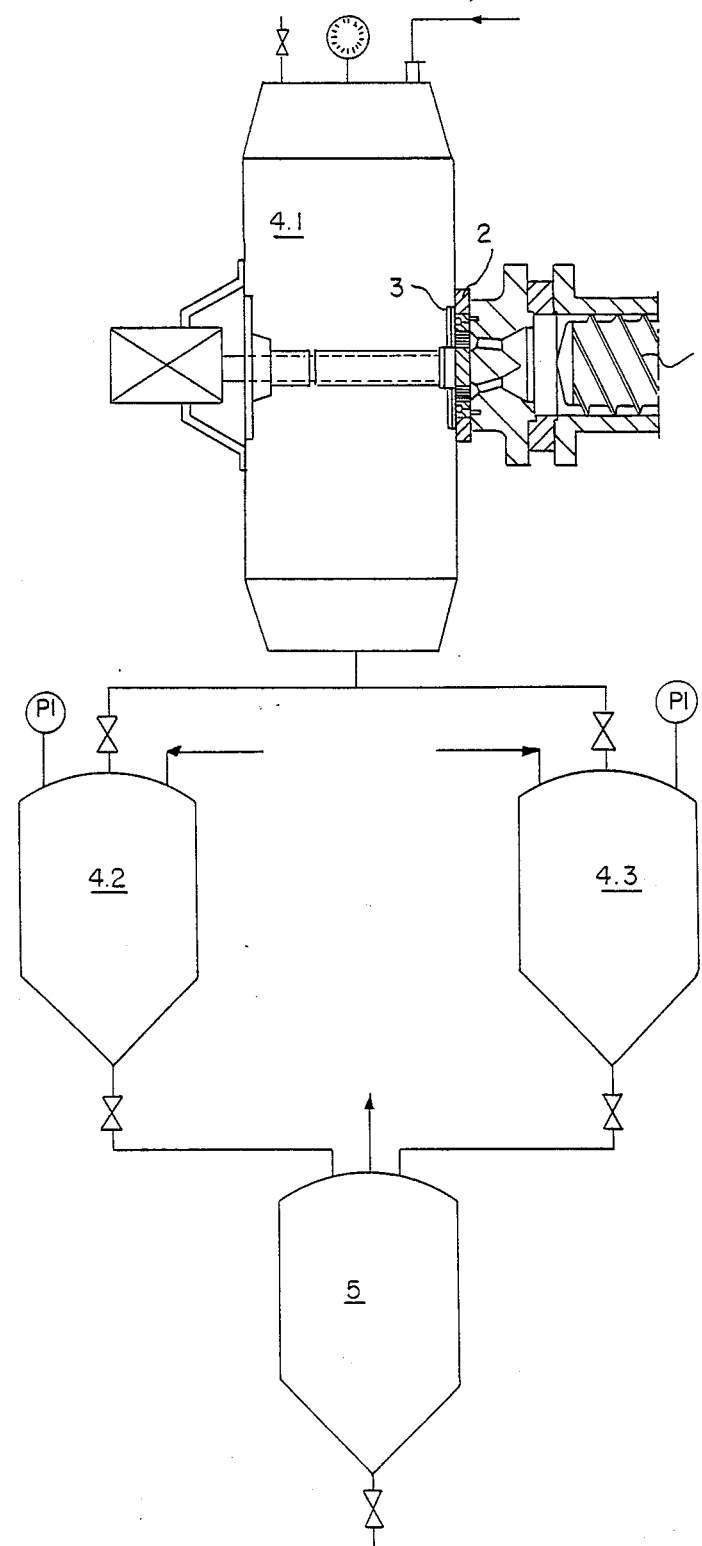

PREPARATION OF POLYOLEFIN FOAMS

BACKGROUND OF THE INVENTION

The present invention relates to a process for the preparation of fairly high density polyolefin foams which predominantly have taut, closed cells and do not exhibit undesirable after-shrinkage.

It is known that polyolefin foams can be prepared by letting down a hot, pressurized homogeneous mixture which consists of a polyolefin and a volatile blowing agent. As a rule, the procedure is carried out in a continuous mixing apparatus with ejection of the polyolefin/blowing agent gel. When the mixture is let down into the atmosphere, the blowing agent evaporates with formation of a substantially closed-cell foam. In this process, as described in, for example, DE-B No. 25 24 196, it is only possible to obtain foams having a density of less than 30 g/l, which subsequently exhibit considerable shrinkage. When an attempt is made to increase the foam density by reducing the content of blowing agent in the gel, the heat of vaporization of the blowing agent when the mixture is let down is not sufficient to cool the polyolefin to such an extent that it solidifies. The foam therefore collapses.

SUMMARY OF THE INVENTION

It is an object of the present invention to provide a process for the preparation of polyolefin foams which have a density of from 30 to 300 g/l, do not exhibit undesirable after-shrinkage and have predominantly taut, closed cells.

We have found that this object is achieved, according to the invention, if the polyolefin/blowing agent gel is only partially let down prior to being let down to atmospheric pressure, and the foam is kept at superatmospheric pressure until it has solidified with cooling.

The present invention therefore relates to a process for the preparation of polyolefin foams having a density of from 30 to 300 g/l by letting down a homogeneous mixture of polyolefin and from 10 to 50% by weight, based on the polyolefin, of a volatile blowing agent with or without conventional additives, the said mixture being 10°–50° C. below the DSC maximum of the polyolefin and under a pressure which is higher than the vapor pressure of the blowing agent at this temperature, wherein, before being let down to atmospheric pressure, the mixture is first let down to 0.1–10 bar gage pressure and the resulting foam is kept at this pressure until it has cooled to a temperature which is at least 20° C. below the expansion temperature.

For the purposes of the present invention, polyolefins are crystalline olefin polymers whose X-ray crystallinity at 25° C. is greater than 25%. Low, medium and high density polyethylenes, for example those having a density of from 0.916 to 0.965, preferably from 0.920 to 0.935, g/cm$^3$, as prepared by high pressure, low pressure and medium pressure processes, polypropylene and ethylene and propylene copolymers which contain not less than 50 mol % of ethylene and/or propylene units are suitable for the process. Examples of suitable comonomers are α-alkenes of not more than 12 carbon atoms, such as propylene, butene, pentene, hexene or octene, vinyl esters, such as vinyl acetate, and esters of acrylic acid, methacrylic acid, maleic acid or fumaric acid with alcohols of 1 to 8 carbon atoms. The polyolefins generally have a melt flow index of from 0.3 to 8, preferably from 1 to 3, a melting range of from 100° to 170° C. and a shear viscosity of from $1\times10^3$ to $1\times10^6$, measured in a rotational viscometer at 150° C. and an angular frequency range of from $10^{-2}$ to $10^2 s^{-1}$. Blends of different polyolefins can also be used. Ethylene homopolymers and copolymers which carry from 1 to 5 side chains per 100 carbon atoms in the polymer chain, such as commercial LDPE, LLDPE and HDPE grades, are preferably used.

Furthermore, all other olefin polymers which are generally used in the prior art for foam production can be used for the present process.

The volatile blowing agents used are hydrocarbons and halohydrocarbons whose boiling points are from −40° to 80° C. under atmospheric pressure. Branched and straight-chain aliphatic and alicyclic hydrocarbons, such as propane, propene, butane, butene, pentane, pentene, hexane, hexene, heptane, cyclobutane, cyclopentane or cyclohexane, and halohydrocarbons, such as trichlorofluoromethane, dichlorodifluoromethane, monochlorodifluoromethane, trichlorotrifluoroethane, dichlorotetrafluoroethane, methyl chloride, methylene chloride, ethyl chloride and ethylene chloride, are suitable. Mixtures of blowing agents can also be used. The blowing agent is employed in an amount of from 10 to 50, for example from 15 to 45, preferably from 20 to 40, % by weight, based on the polyolefin.

The polyolefin/blowing agent mixture to be let down may contain conventional additives in the usual amounts, e.g. pigments, dyes, fillers, flameproofing agents, antistatic agents, stabilizers, lubricants, plasticizers and nucleating agents.

The concomitant use of nucleating agents makes it possible to regulate the cell size. Suitable nucleating agents are known from the prior art. For example, talc, calcium carbonate, calcium sulfate, diatomaceous earth, magnesium carbonate, magnesium hydroxide, magnesium sulfate, clay and barium sulfate are useful.

The nucleating agents are generally used in amounts from 0.5 to 5, preferably from 0.5 to 2, % by weight, based on the polyolefin.

The foam is prepared starting from a homogeneous mixture of polyolefin, blowing agent and, if required, additives. The blowing agent should be dissolved or finely dispersed in the polyolefin. The mixture is generally prepared in a conventional mixing apparatus, for example in an extruder. However, it can also be prepared by impregnating the polyolefin with the blowing agent in a conventional pressure vessel.

The expansion temperature, i.e. the temperature of the polyolefin/blowing agent mixture immediately prior to being let down, is 10°–50° C., preferably 20°–30° C., below the DSC maximum of the polyolefin. It is known that the melting point of the polyolefin can be depressed by the blowing agent dissolved therein. The expansion temperature must therefore also be above the softening point of the mixture. The optimum temperature can readily be determined for each mixture by preliminary experiments.

Before being let down, the blowing agent/polymer mixture is under a pressure which is higher than the vapor pressure of the blowing agent at the expansion temperature. The pressure is, for example, from 10 to 100, in particular from 30 to 70, bar gage pressure.

An essential feature of the invention is that, before being let down to atmospheric pressure, the polyolefin/blowing agent gel is first let down to 0.1–10, preferably 0.5–5, in particular 0.5–2, bar gage pressure and the resulting foam is kept at this pressure until it has cooled to a temperature which is at least 20° C., preferably at least 30° C., below the expansion temperature. The foam solidifies during this time. The optimum temperature and residence time can readily be determined by preliminary experiments. If the temperature during let-down to atmospheric pressure is too high, the foam expands further and subsequently shrinks during storage, so that it no longer possesses taut cells, or the foam tears with further expansion. It is important that the interior of the foam too has sufficiently cooled and solidified.

After the pressure has been let down to atmospheric pressure, the cells of the foam are under super-atmospheric pressure due to the gaseous blowing agent. The gas then slowly permeates into the atmosphere while at the same time air or the surrounding gas penetrates the cells. Surprisingly, the novel procedure substantially prevents shrinkage of the foam during storage. Because of the higher density of the foam, its strength is sufficiently high to withstand the external pressure even during the phase in which the interior of the cells is temporarily under reduced pressure owing to the higher permeation rate of blowing agent compared with air or nitrogen.

The foam density can be adjusted by varying the pressure in the first let-down phase. The higher the pressure, the higher is the density. Thus, all ranges from 30 to 300 g/l can be obtained.

Advantageously, an air or nitrogen atmosphere is initially present in the let-down chamber. Due to permeation of the blowing agent, the gaseous blowing agent then accumulates in the let-down chamber. However, it is also possible initially to take the blowing agent which is gaseous under the pressure and temperature conditions in the let-down chamber. The pressure in the chamber is advantageously kept constant or substantially constant. The blowing agent escaping from the foam can thus readily be recovered and reused.

It is advantageous to cool the foam relatively slowly in the first let-down phase, advantageously with a temperature gradient of from 0.5° to 5° C./min. This also eliminates stresses in the cell walls, and the foam becomes more heat-stable. The residence time in the let-down zone can vary within wide limits, for example from 0.5 to 60 minutes.

During subsequent let-down to atmospheric pressure, advantageously into an air or nitrogen atmosphere, little or no subsequent expansion occurs, any expansion taking place being less than 10% by volume and substantially reversible, i.e. being lost during storage. The resulting foam has a density of from 30 to 300, preferably from 35 to 100, in particular from 40 to 80, g/l.

By a suitable choice of die for extrusion, any foam profiles can be produced, for example webs, sheets and circular profiles.

The process is advantageous for the preparation of foam particles, for example having a diameter from 1 to 50 mm, in particular from 5 to 20 mm. For this purpose, the extrudate leaving the extruder is comminuted to particles by a conventional face-cutting apparatus before or after expansion. The resulting foam particles can then be sintered in a conventional manner by heating in a mold which is not gas-tight to give moldings. Before being welded to form moldings, the particles can be crosslinked in a conventional manner by high-energy radiation. Surprisingly, however, moldings which are dimensionally stable and have a smooth surface can also be prepared using uncrosslinked foam particles prepared according to the invention.

The foams obtained possess taut cells having a diameter of about 0.01–1 mm, depending on the type and amount of any nucleating agent used. Fairly high density foams generally have smaller cell than low density foams.

DESCRIPTION OF THE DRAWING

The single FIGURE shows an example of an apparatus useful in carrying out the process of the present invention.

EXAMPLE 1

100 parts by weight of an ethylene homopolymer which has been prepared by the high pressure process and has a density of 0.920 are mixed with 1 part by weight of talc and 30 parts by weight of dichlorotetrafluoroethane under superatmospheric pressure in a twin-screw extruder 1 (L/D=40). The polyolefin/blowing agent gel is cooled to about 87° C. (about 20° C. below the DSC maximum (107° C.) of the polyolefin) in the extruder and let down through a die 2, in front of which a rotating multiblade cutter 3 is arranged, into a chamber (4.1, 4.2, 4.3) which is under 4 bar gage pressure. After cooling for 10 minutes, during which the foam cools to 50° C., the foam is let down to atmospheric pressure into (5). Extremely taut non-shrinking foam particles which have a diameter of 12 mm, a cell size of 0.2 mm and a density of 120 g/l are obtained.

If the expansion process is carried out under atmospheric pressure, the foam particles obtained have a density of 25 g/l, exhibit a very pronounced shrinkage and do not have taut cells.

EXAMPLE 2

The procedure described in Example 1 is followed, except that, instead of dichlorotetrafluoroethane, 40 parts by weight of dichlorodifluoromethane are used as the blowing agent, and the melt containing the blowing agent is forced through a multi-hole die into a space under 2 bar gage pressure, and the foam is allowed to remain there until it has cooled to 50° C., which takes 6 minutes, and is then let down to atmospheric pressure.

The resulting foam has a density of 52 g/l and a smooth surface and is dimensionally stable.

If the melt containing the blowing agent is let down to atmospheric pressure in a conventional manner directly after leaving the die, the foam obtained has a density of 23 g/dm$^3$ and, after storage for only one day, exhibits a volume change of almost 50% and has a wrinkled surface.

The novel foam particles can be processed in a conventional manner, without crosslinking by radiation, to give moldings having a density of 65 g/l.

EXAMPLE 3

In a single-screw extruder (L/D=20), downstream of which is a second single-screw extruder, 100 parts of an LLDPE having a broad molecular weight distribution and a density of 0.922 g/cm$^3$, a melt flow index (190/2.16) of 1.2 g/10 min, a mean molecular weight of 115,000, a crystallinity of 45%, a comonomer content of 8.3% by weight of but-1-ene, a DSC maximum of 126° C., two side branches per 100 carbon atoms and a viscosity of $4 \times 10^3$ Pa.s, measured at 190° C. and at a shear velocity of 10 s$^{-1}$ are mixed, at 185° C., with 0.3 part of talc as a cell regulator and 35 parts of difluorodichloromethane, which is metered in under 60 bar, to give a homogeneous mixture, and the mixture is cooled to 100° C. in the second extruder. The polyolefin/blowing agent mixture, which is under 60 bar, is let down through a multi-hole die into a chamber under 0.8 bar gage pressure, during which procedure it is face-cut with a multiblade cutter directly adjacent to the die to give foam particles having a diameter of 9 mm and an L/D of 1.

After a residence time of 5 minutes in the excess-pressure chamber, during which the foam particles cool from 86° C. (temperature after expansion) to 70° C., the pressure is let down to atmospheric pressure. Tight foam pellets having a density of 40 g/dm$^3$ are obtained.

If, for comparison, the expansion process is carried out under atmospheric pressure, the foam particles obtained have a density of 26 g/dm$^3$ but exhibit pronounced after-shrinkage.

The taut foam particles having a density of 40 g/dm$^3$ are transferred, under a filling pressure of 0.6 bar, to a closed mold consisting of two halves and are treated with steam under 1.5 bar for 3.5 sec and thus joined at points. After the steam has been let down, the foam beads undergo complete welding. After thorough cooling for 70 sec, the foam molding is removed from the mold. The resulting foam has a density of 55 g/dm$^3$, can be used, for example, as edge protection in the packaging sector and has excellent cushioning characteristics.

We claim:

1. A process for the preparation of a polyolefin foam having a density of from 30 to 300 g/l which comprises extruding through a die a homogeneous mixture of a polyolefin and from 10 to 50% by weight, based on the polyolefin, of a volatile blowing agent, with or without conventional additives, the said mixture being 10-50° C. below the DSC maximum of the polyolefin and under a pressure higher than the vapor pressure of the blowing agent at this temperature, wherein said mixture is extruded through said die into a chamber pressurized from 0.1 to 10 bar gage to form a foam and said foam is maintained at this pressure until it has cooled to a temperature which is at least 20° C. below the expansion temperature, thereafter said foam is let down to atmospheric pressure, such that a polyolefin foam having a density of from 30 to 300 g/l. is produced.

2. A process as defined in claim 1 wherein after extrusion through said die, the extrudate leaving the extruder is comminuted to particles before or after expansion.

3. A process as defined in claim 1, wherein the mixture is let down into an atmosphere of air or nitrogen.

4. A process as defined in claim 1 wherein the chamber into which the mixture is extruded is pressurized from 0.5-5 bar gage pressure.

5. A process as defined in claim 1, wherein foam cell size is regulated from 0.01-1 mm by the concomitant use of a nucleating agent.

6. A process as defined in claim 2, wherein foam particles having a mean diameter of from 1 to 50 mm are prepared.

* * * * *